(12) United States Patent
Coca Figuerola et al.

(10) Patent No.: US 9,246,325 B2
(45) Date of Patent: Jan. 26, 2016

(54) CONNECTION DEVICE FOR TRANSFORMER SUBSTATION MODULES

(75) Inventors: Carlos Coca Figuerola, Igorre (ES); Jose Ignacio Carmona Ruiz, Igorre (ES); Luis Flores Losada, Madrid (ES); Jose Antonio Sanchez Ruiz, Igorre (ES); Jose Luis Sabas Fernandez, Igorre (ES); Miguel Rubio Chuan, Igorre (ES)

(73) Assignee: ORMAZABAL Y CIA, S.L.U., Igorre (ES)

( * ) Notice: Subject to any disclaimer, the term of this patent is extended or adjusted under 35 U.S.C. 154(b) by 544 days.

(21) Appl. No.: 13/812,704

(22) PCT Filed: Jul. 28, 2010

(86) PCT No.: PCT/ES2010/070524
§ 371 (c)(1),
(2), (4) Date: Mar. 25, 2013

(87) PCT Pub. No.: WO2012/013831
PCT Pub. Date: Feb. 2, 2012

(65) Prior Publication Data
US 2013/0182355 A1   Jul. 18, 2013

(51) Int. Cl.
| | |
|---|---|
| *H02H 7/04* | (2006.01) |
| *H01F 27/40* | (2006.01) |
| *H02B 7/06* | (2006.01) |
| *H01F 27/04* | (2006.01) |
| *H02B 13/00* | (2006.01) |

(52) U.S. Cl.
CPC ............... *H02H 7/04* (2013.01); *H01F 27/402* (2013.01); *H02B 7/06* (2013.01); *H01F 27/04* (2013.01); *H02B 13/005* (2013.01)

(58) Field of Classification Search
CPC .......... H02H 7/04; H01F 27/402; H01F 27/04; H02B 7/06; H02B 13/005
See application file for complete search history.

(56) References Cited

U.S. PATENT DOCUMENTS

| | | |
|---|---|---|
| 3,513,425 A | 5/1970 | Arndt |
| 3,868,616 A | 2/1975 | Yonkers |
| 3,878,434 A * | 4/1975 | Voorhoeve ............. H02H 9/008 361/111 |

(Continued)

FOREIGN PATENT DOCUMENTS

| | | |
|---|---|---|
| BE | 572284 | 11/1958 |
| DE | 9202127 | 5/1992 |

(Continued)

OTHER PUBLICATIONS

International Preliminary Report on Patentability for international application No. PCT/ES2010/070524 dated Jul. 26, 2012.

*Primary Examiner* — Zeev V Kitov
(74) *Attorney, Agent, or Firm* — Gardner Groff Greenwald & Villanueva, PC

(57) ABSTRACT

The present invention relates to a transformer substation (6) comprising high-voltage switchgear (1), a low-voltage switchboard (3) and a transformer (2) which are electrically interconnected on the upper cover (5) of the transformer (2) through a shielded direct single-pole connection. The high-voltage electric connection (4) is carried out by means of a connection device (8) which, in combination with a control/protection device (10), allows carrying out the safe and integral protection of people and property against possible malfunctions in the transformer substation (6), limiting said malfunctions and preventing disturbances of the high-voltage and low-voltage network.

18 Claims, 3 Drawing Sheets

(56) References Cited

U.S. PATENT DOCUMENTS

| | | | |
|---|---|---|---|
| 4,242,713 A * | 12/1980 | Lewis, Jr. | G01R 31/263 340/645 |
| 6,295,190 B1 * | 9/2001 | Rinaldi | G01R 31/3274 361/115 |
| 6,583,977 B1 * | 6/2003 | Oglesbee | H01H 85/46 361/103 |

FOREIGN PATENT DOCUMENTS

| | | |
|---|---|---|
| DE | 102007057017 | 5/2009 |
| EP | 0769795 | 4/1997 |
| EP | 1267367 A1 | 12/2002 |
| EP | 1326313 | 7/2003 |
| EP | 1533877 | 5/2005 |
| ES | 2155037 | 4/2001 |
| ES | 2228264 | 4/2005 |
| FR | 2530067 | 1/1984 |
| FR | 2782418 | 2/2000 |
| FR | 2826194 | 12/2002 |
| FR | 2881001 | 7/2006 |
| FR | 2905532 | 3/2008 |
| WO | 02075757 | 9/2002 |
| WO | 03032458 | 4/2003 |
| WO | 2004012312 | 2/2004 |

* cited by examiner

CONNECTION DEVICE FOR TRANSFORMER SUBSTATION MODULES

IN THE CROSS-REFERENCE TO RELATED APPLICATIONS

This application is a U.S. national phase application under 35 USC 371 of international application number PCT/ES2010/0070524, filed Jul. 28, 2010, which is hereby incorporated herein by reference in its entirety for all purposes.

OBJECT OF THE INVENTION

The transformer substation object of the present invention comprises at least high-voltage switchgear, at least one low-voltage switchboard and a transformer, with the particularity that said transformer substation comprises a connection device which allows carrying out the high-voltage electric connection between the transformer and the high-voltage switchgear, without using external cables, and which further allows a safe and integral protection of people and property against possible malfunctions in the transformer substation, said connection device comprising to that end measurement/control means and at least one protective element against fault currents. The measurement/control means are associated with at least one control/protection device of the transformer substation, such that in the case of a fault event or incident in said substation, the control/protection device allows the disconnection of said substation, preventing disturbances of the high-voltage and low-voltage network.

Likewise, the modular transformer substation object of the invention is not formed as a specifically designed single block but rather it is made up of the same individual components used in any transformer substation, i.e., the transformer, high-voltage switchgear and low-voltage switchboard, maintaining each of these components with its own separate identity, such that is possible to disassemble the high-voltage or low-voltage switch gear, each element being maintained in perfect use conditions. This feature considerably increases the flexibility of the transformer substation against single block or integrated design solutions. In this sense, this equipment belongs to the family of compact equipment for transformer substations, designed and tested as a single piece of equipment with their nameplate and transported and supplied as a transport unit. Each component or functional unit comprised in the transformer substation object of the invention comprises an independent insulation and cooling means that is not shared with the remaining components.

BACKGROUND OF THE INVENTION

Electric transformer substations are basically formed by three essential elements or parts or functional units, though functionally independent from one another, one of which parts consists of high-voltage switchgear, whereas a second part consists of a transformer, the third part being formed by a low-voltage switchboard, such that these parts are independent and are electrically connected. In this sense, in said transformer substations in which the functional units are independent, each of them has independent insulation and cooling means that is not shared with other units.

According to a common configuration, high-voltage switchgear comprise a line connection and an outgoing feeder, forming a loop, as well as a third protection position supplying the transformer, from which the low-voltage electric power in turn exits, this outgoing feeder of the transformer being connected to the low-voltage switchboard or module having the corresponding bases for the connection of outgoing feeder cables for the distribution and corresponding low-voltage power supply of the installation or building in question.

The transformer substation is supplied through the high-voltage line connection of the first feeder switchgear, which is connected, through the outgoing feeder of the loop, with the second feeder switchgear, which allows isolating a building or an installation without the power supply to the remaining installations being cut off as a result. The electric power is led from this second feeder switchgear to the next transformer substation, which will logically supply another installation.

The transformer is supplied through the third position or switchgear, carrying out the electric connection between both elements by means of external cables, as is shown, for example, in patents ES2228264B2, EP1267367A1, FR2881001B1, FR2826194B1, FR2905532A1 and DE9202127U1, which are exposed, being able to lead to unwanted breakdowns and accidents. Furthermore, this wiring must be carried out "in situ", which requires specialized operators for correctly carrying out the various connections. Specifically, the connections between the high-voltage switchgear and the transformer are carried out by means of cables with terminals at their ends, the terminals usually being constructed at the building site, therefore they are not subjected to the relevant tests to check the quality of the coupling.

The connection between the transformer and the switchgear can also be carried out by means of a direct connection without using cables, as is shown, for example, in patents ES2155037B1, EP1326313A1, WO2004012312A1, WO03032458A1, WO02075757A1 and FR2782418B1.

The third position, referred to as protection switchgear, incorporates protection of the transformer, usually by means of fuses or even by means of a circuit breaker. These fuses are usually installed inside the high-voltage switch gear, but there are also solutions in which they are integrated in the tank itself of the transformer, immersed in the oil itself of the transformer, or inside a bay independent of the high-voltage switch gear and the transformer, as defined for example in patent FR2782418B1.

The function of said fuses is to prevent electric failures that may occur downstream, i.e., in the low-voltage distribution network, in the low-voltage switchboard, in the high-voltage interconnection or in the transformer, from affecting the substation, thus limiting the extent of the incident.

In this sense, patent FR2782418B1 protects both embodiments with regard to the arrangement of the fuses, both inside the tank of the transformer and inside a bay independent from the high-voltage switch gear and the transformer. In each of the embodiments of said patent, the fuses are accompanied by a breaker, which is also arranged together with the fuses inside the tank of the transformer or inside the mentioned independent bay. In the first case, the fuses and the breaker are insulated in the dielectric liquid itself of the transformer, and in the second case, in a dielectric gas comprised in the mentioned bay. In this latter case, the bay is assembled on the cover of the transformer and on the high-voltage switch gear, the transformer—bay—high-voltage switchgear interconnection being carried out by means of bushings comprised in the transformer, the mentioned bay and the high-voltage switch gear. Therefore, this French patent uses the interconnection between transformer and high-voltage switch gear to include in it part of the protection of the transformer substation, which in the remaining mentioned patent examples is included inside the switchgear or high-voltage switch gear, except in WO03032458A1. In a possible embodiment of this last patent document, part of the protective elements, such as fuses, is also arranged inside an independent protection module.

The assembly determined by the high-voltage switchgear, the transformer and the low-voltage switchboard are usually arranged in a closed room which, in most cases, corresponds to the basement or storage area of the building which is to be supplied, or else in a shed outside and close to the building, which must offer sufficient safety and ergonomic conditions for operators, made in suitable accesses or spaces appropriate for the operation and installation of the equipment.

The main requirement with respect to space is the need to have a clear front of approximately one meter wide both in the high-voltage switch gear and in the low-voltage switch gear, as well as an access corridor and safety distances to elements which are energized and can be accessible by operators or third persons. This means that in practice, a large amount of space is necessary for the placement of all the components of the substation, which involves an enormous cost for the power supply company. This is why there is great interest today in compact equipment which occupies increasingly smaller spaces.

In this sense, the solution of patent FR2782418B1 involves the drawback that due to installing the fuses inside the transformer, this transformer has larger dimensions and therefore occupies greater space than a conventional transformer does. The same space problem is involved in the case in which the fuses are installed inside a bay which is assembled on the cover of the transformer and on the high-voltage switch gear, because yet another projection is added to the transformer substation. Furthermore, due to the dielectric medium used in said bay and therefore due to the insulation distances to be respected between phases, said bay can occupy considerable space, and accordingly the transformer substation can be bulkier. Likewise, due to using a gas as a dielectric medium in said bay, in the event that any of the fuses melts, said bay must be replaced with a new one, which entails in addition to the disassembly of said bay, draining the internal gas, this gas being a toxic gas and it can contribute to the greenhouse effect, so a more complicated, more expensive and more meticulous replacement process is required.

Likewise, the solution of patent FR2782418B1 involves the drawback that due to installing the high-voltage and low-voltage switch gear on a vertical plane of the transformer, the cooling fins corresponding to said vertical side or plane of the transformer are eliminated, which involves reducing the useful cooling surface of the transformer, and therefore the increase of the operating temperature thereof. The same problem is repeated in the solution of ES2155037B1.

In relation to the transformers used in the solutions of WO03032458A1, WO02075757A1 and ES2155037B1, these transformers are "special" transformers because in the solution in WO02075757A1, the low-voltage bushings are arranged in a vertical side of the transformer, whereas in the case of the solution in ES2155037B1, both the low-voltage and the medium-voltage bushings are arranged in a vertical side. This configuration of the transformer complicates the assembly tasks during its manufacture because in the operation of cribbing a "standard" transformer, all the elements thereof (windings, magnetic circuit, bushings, etc.) are secured to the cover itself of the transformer, all the necessary electric connections between the elements being carried out beforehand, and they are introduced in the tank once the cover is in place in order to then screw said cover to the tank and subsequently fill it with oil. In this sense, in the case of WO02075757A1 and ES2155037B1, the assembly operations are complicated due to the complexity of carrying out the connections inside the tank between the bushings and the windings.

In the state of the art, as is shown in the mentioned patent examples, in which the interconnection between the transformer and the high-voltage switchgear is used to include part of the protection of the transformer substation, said part of the protection is formed by the fuses and the breakers or switches. The remaining elements forming the protection system of the transformer substation is arranged integrated in the same high-voltage switchgear, such as, for example, electronic relays and measurement and control means associated with said electronic relays, such as, for example, voltage sensors, intensity sensors, voltage transformers, means for receiving/transmitting signals via PLC, means for detecting partial discharges, etc.

As is known, electronic relays and the measurement and control means associated therewith form the intelligent part of transformer substations, i.e., they form an integral protection unit preventing disturbances of the high-voltage and low-voltage network, by isolating a transformer substation in a malfunction. In current transformer substations, the fuse itself is the protection for said substations. The fuse protects the equipment, and if malfunctions of another type not protected by the fuse are to be seen, a relay combined or associated with the fuses can be provided. Likewise, the breaker or switch also acts under the orders of the electronic relay, which orders the opening of said breaker or switch as a consequence of a fault event.

DESCRIPTION OF THE INVENTION

The present invention relates to a modular transformer substation, comprising at least high-voltage switchgear, a transformer and a low-voltage switchboard, such that since said transformer substation is modular, the modules making it up are standard and can be combined giving rise to different end solutions, each of said modules maintaining its own separate identity, such that it is possible to disassemble the high-voltage or low-voltage switch gear, each element being maintained in perfect use conditions.

According to the present invention, the transformer is a conventional transformer, i.e., comprising cooling fins in its four side walls and an upper cover configured to allow a high-voltage electric connection between the transformer and the high-voltage switchgear and a low-voltage electric connection with the low-voltage switchboard.

The high-voltage electric connection between the high-voltage switchgear and the transformer, as well as the low-voltage electric connection between the transformer and the low-voltage switchboard, will be carried out directly on the upper cover of the transformer.

One of the main features of the transformer substation is that the high-voltage electric connection between the high-voltage switchgear and the transformer is carried out through at least one connection device, such that the high-voltage electric connection is carried out without external cables (shielded direct connection), these connections being carried out in the factory, thereby preventing them from being exposed to the exterior, the problems due to the existence of the wiring being solved. Furthermore, these connections are of the plug-in type, which allows the connection and disconnection of the different units when necessary, each independent unit maintaining its functional capacity.

According to the present invention, the connection device comprises at least one insulating body inside which there are encapsulated:

at least one first electric connection element configured for the direct connection to first coupling means provided in the cover of the transformer at least one second electric connection element configured for the direct connection to second coupling means of the high-voltage switchgear at least one protective element comprising a current-limiting fuse element that can cause the disconnection of the substation when a fault current causing the fuse element to melt occurs, and in that the connection device comprises at least one measurement and control means which, in combination with at least one control/protection device of the substation, can order the opening of a switch of the high-voltage switchgear causing the disconnection of the substation, such that the mentioned protective element acts against fault currents the intensity of which causes the fuse element to melt whereas against fault currents of intensities that do not the fuse element to melt, the control/protection device orders the disconnection of the substation.

Since all the elements corresponding to the connection device are encapsulated in at least one solid insulating body (of high electric resistance), the insulation distance between the phases forming the high-voltage electric connection, the size of the installations and, in short, the costs, are reduced. Furthermore, due to the use of a solid insulation medium, the replacement of the connection device does not involve a complicated or expensive process because it is not necessary to perform operations such as draining gas, for example.

The at least one control/protection device can comprise an electronic relay of the transformer substation. The at least one measurement/control means can comprise any of the following elements: a voltage sensor, intensity sensor, voltage transformer, means for receiving/transmitting signals via PLC, means for detecting partial discharges, etc.

The at least one protective element can be a high rupturing capacity current-limiting fuse, said protective element being a supporting protection for the control/protection device of the transformer substation. The constitution of the protection system of the substation by means of at least one control/protection device and the protective element thus allows using a switch with fewer features, which entails a saving in the end costs of the transformer substation. In this sense, the switch will be triggered by the melting of the supporting fuse by means of the electronic combination with a relay and an indication of the melt only for the case of a fault after a pre-established value, such as an internal short circuit in the transformer, for example. For the remaining faults and incidents that can occur in the transformer substation, the control/protection device allows carrying out the control and the protection of said substation.

In this sense, the control/protection device has indication means for indicating the reason for the disconnection of the substation and orders the opening of the switch as a consequence of:

Overload of the transformer according to the initial load state of the transformer and the ambient temperature.

Variation of pressure inside the transformer.

Variation of the temperature (can be with direct or indirect measurement) in the dielectric medium of the transformer.

Leak of the dielectric medium of the transformer.

Short circuit in the low-voltage interconnection between the transformer and low-voltage switchboard.

Phase-ground impedance malfunctions (fault) of the low-voltage distribution network.

Homopolar malfunctions (homopolar fault) in the transformer substation.

Internal short circuits in the transformer. In this case the opening of the switch is ordered as a consequence of the actuation of the protective element (trigger by melting of the supporting fuse by means of an electronic combination with a relay and indication of the melt).

A reverse power (distributed generation).

Additionally, the connection, control and protection device comprises at least one additional connection element which allows installing the measurement/control means through third coupling means, said measurement/control means being able to comprise at least one voltage sensor, at least one voltage transformer, means for receiving/transmitting signals via PLC, means for detecting partial discharges, etc.

The second coupling means of the high-voltage switchgear can comprise standardizing shields for standardizing the electric field, which in turn allow the capacitive voltage tap. Likewise, these second coupling means can comprise at least one transformer or toroidal sensing device installed on the outside, and in the base, of said coupling means for sensing the intensity and/or supply signal of the control/protection device.

The first, second and third coupling means can consist of screw-in or plug-in bushings of the female type, male type, and their combinations, or of a closure plug to assure insulation.

DESCRIPTION OF THE DRAWINGS

To complement the description and for the purpose of aiding to better understand the features of the invention according to a preferred practical embodiment thereof, a set of drawings is attached as an integral part of said description in which the following has been depicted with an illustrative and non-limiting character.

PREFERRED EMBODIMENT OF THE INVENTION

Figure 1:
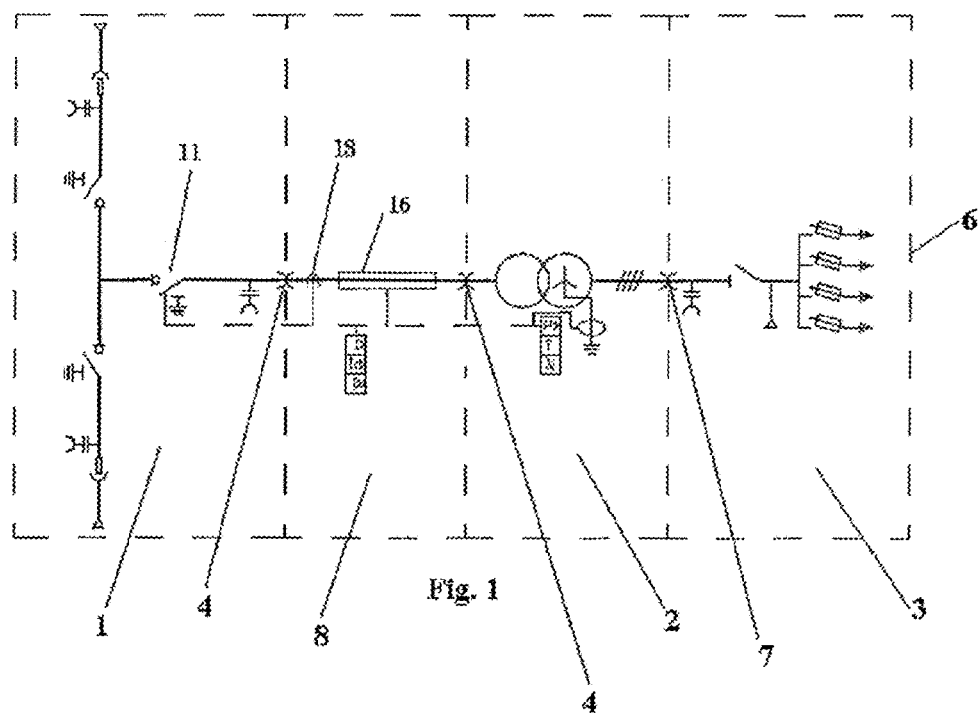
FIG. 1 depicts a single-line diagram of the transformer substation (6) object of the invention, in which at least high-voltage switchgear (1), a transformer (2) and a low-voltage switchboard (3), as well as the connection device (8) which allows the high-voltage electric connection (4) between the transformer (2) and the high-voltage switchgear (1), are distinguished.

In view of FIG. 1, it can be seen how the modular transformer substation (6) is made up of at least high-voltage switchgear (1), a transformer (2) and a low-voltage switchboard (3), the high-voltage switchgear (1) being connected to the transformer (2) and the latter to the low-voltage switchboard (3).

One of the features of said transformer substation (6) is that the transformer (2), the high-voltage switchgear (1) and the low-voltage switchboard (3) are arranged as a single assembly but with a modular character, and it is based on the fact that the high-voltage switchgear (1), the transformer (2) and the low-voltage switchboard (3) are conventional units and that the connection between them can be of the plug-in type, which allows the connection and disconnection of the different units when necessary, each independent unit maintaining its functional capacity. The components integrated in the transformer substation (6) can evolve both on a technological and functional level, allowing their integration in the complete substation (6) during the service life thereof.

The modular transformer substation (6) is provided as a single piece of equipment that is completely assembled and tested in the factory, such that the customer must simply connect the high-voltage line connection cables and the outgoing feeder cables of the low voltage.

Figure 4:
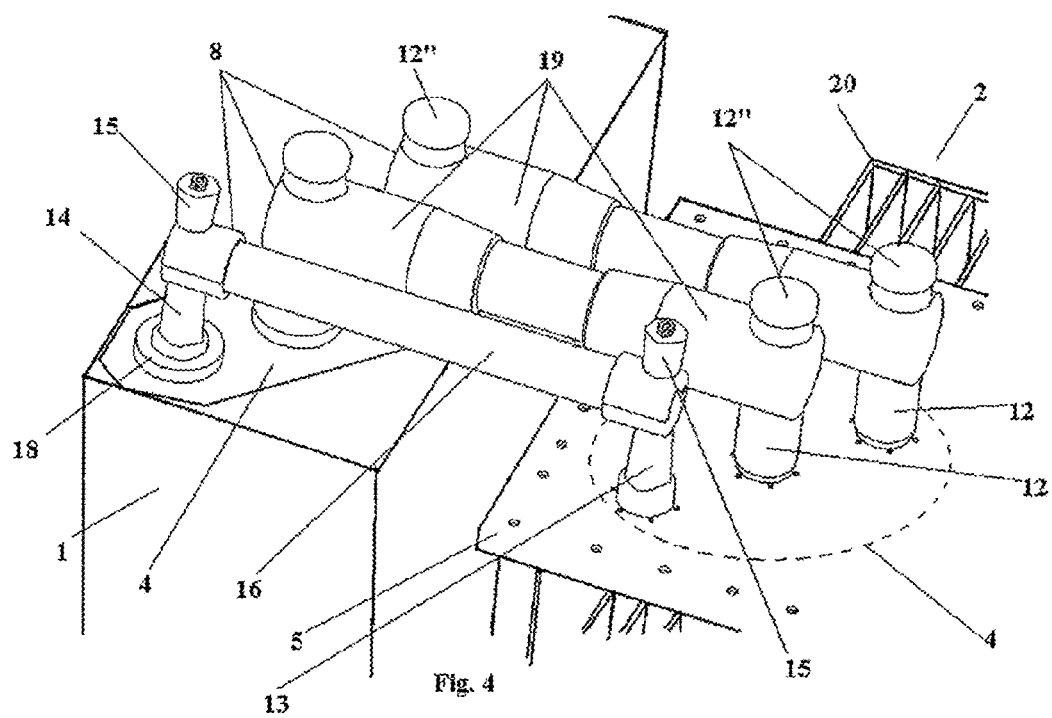
FIG. 4 depicts a detail of the high-voltage electric connection (4) carried out through the connection device (8), showing the inside of the device (8) corresponding to a phase provided with at least one high rupturing capacity protective element (16) and coupling means (15) which allow installing measurement and control means (9).
Figure 5:
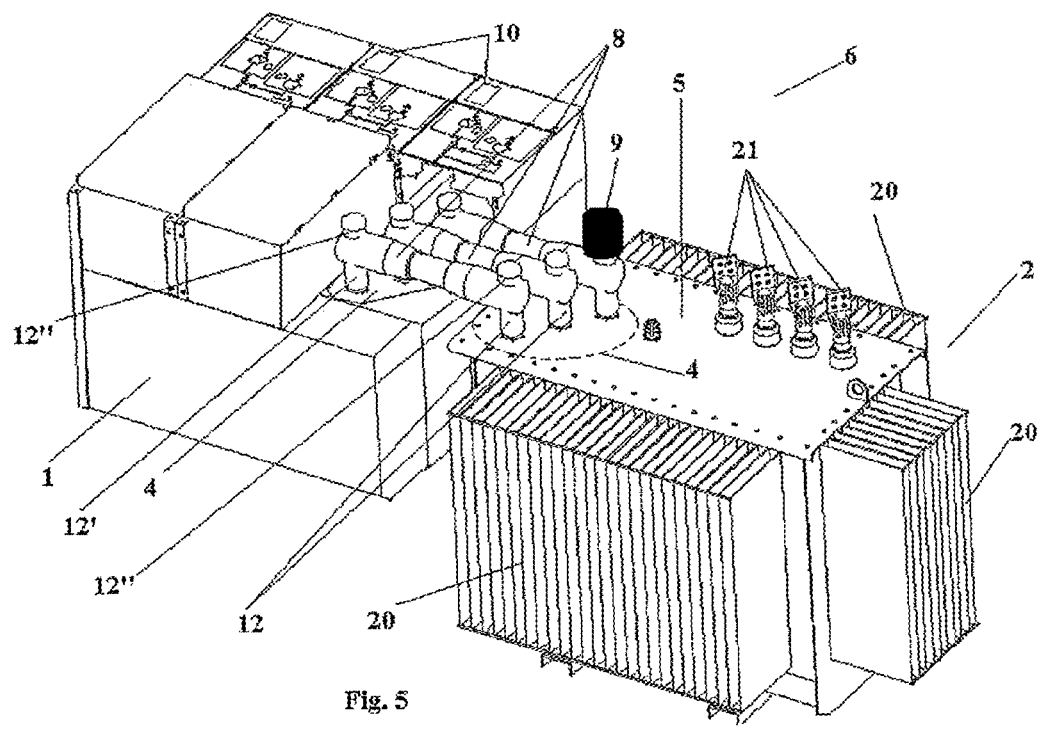
FIG. 5 depicts a perspective view of the modular transformer substation (6) with connection device (8).

Given that the transformer (2) is conventional, and therefore comprises at least one first coupling means (13) and at least another coupling means (21) on its upper cover (5), the high-voltage electric connection (4) between the high-voltage switchgear (1) and the transformer (2), as well as the low-voltage electric connection (7) between the transformer (2) and the low-voltage switchboard (3), are carried out directly on the upper cover (5) of the transformer (2), as shown in FIGS. 4 and 5. In these FIGS. 4 and 5, the coupling means (13) and (21) are made up of male-type transformer bushings.

Another important feature of the modular transformer substation (6), as can be observed in FIGS. 4 and 5, is that the high-voltage switchgear (1) and the transformer (2) are connected through a connection device (8), such that the high-voltage electric connection (4) is a shielded direct single-pole plug-in and inaccessible connection, without external cable jumpers or terminals, these connections being carried out in the factory. To that end, the connection device (8) comprises at least one first connection element (12) configured for the direct connection to the mentioned first coupling means (13) of the transformer (2). Likewise, the connection device (8) comprises at least one second connection element (12') configured for the direct connection to second coupling means (14) of the high-voltage switchgear (1).

On the other hand, as can be seen in FIGS. 4 and 5, the connection device (8) is encapsulated in at least one solid insulating body (19) of high electric resistance, such that it allows reducing the insulation distances between phases, without needing to use any independent bay or gas as an insulation medium, which in short allows reducing the dimensions of the transformer substation to be installed.

FIG. 5 shows how the connection device (8) comprises measurement/control means (9), such as, for example, voltage sensors, voltage transformers, intensity sensors, means for receiving/transmitting signals via PLC or means for detecting partial discharges. Said device (8) additionally comprises encapsulated therein at least one protective element (16) for protecting against high fault currents, such as a fuse, for example. The mentioned measurement/control means (9) are associated with at least one control/protection device (10) integrated in the high-voltage switchgear (1) as shown in FIG. 5. In this sense, said control/protection device (10) allows carrying out the control and the protection of the transformer substation (6), i.e., the control/protection device (10) allows identifying the problems or incidents that may arise in said transformer substation (6), communicating them to the operator remotely or face-to-face, collecting and storing the parameters for detecting the failures, indicating the reason for the disconnection of the transformer substation (6) and ordering the opening of at least one switch (11) for the disconnection of the mentioned substation (6). In short, the combination of the measurement/control means (9) with the control/protection device (10) allows having an integral protection unit which prevents disturbances of the high-voltage and low-voltage network, by isolating the transformer substation (6) in a malfunction. Therefore, the aforementioned protective element (16) is a supporting protection which only acts against high fault currents, such as internal solid short circuits in the transformer unit (2), for example. Only in this type of failure will the switch (11) be triggered by the melting of the supporting fuse (16) by means of the electronic combination with the control/protection device (10) and an indication of the phase in a malfunction.

The combination of the protective element (16) plus the control/protection device (10) allows using a switch (11) with fewer features, whereby reducing the end costs of the transformer substation (6).

The control/protection device (10) has indication means for indicating the reason for the trigger and orders the opening of the switch (11) as a consequence of:

Overload of the transformer according to the initial load state of the transformer and the ambient temperature.

Variation of pressure inside the transformer.

Variation of the temperature in the dielectric medium of the transformer.

Leak of the dielectric medium of the transformer.

Short circuit in the low-voltage interconnection between the transformer and low-voltage switchboard.

Phase-ground impedance malfunctions of the low-voltage distribution network.

Homopolar malfunctions in the transformer substation.

Internal short circuits in the transformer. The trigger by the melting of the supporting fuse by means of an electronic combination with a relay and indication of the melt will only occur in this type of fault.

A reverse power (distributed generation).

Likewise, the control/protection device (10) has means for estimating the remaining service life of the transformer unit (2).

As shown in FIGS. 4 and 5, the connection device (8) comprises at least one additional connection element (12") which allows installing the measurement/control means (9) through third coupling means (15).

The possibility that the first, second and third coupling means (13, 14, 15) can consist of female-type bushings, male-type bushings and their combinations or of a closure plug to assure insulation has been contemplated.

Figure 2:
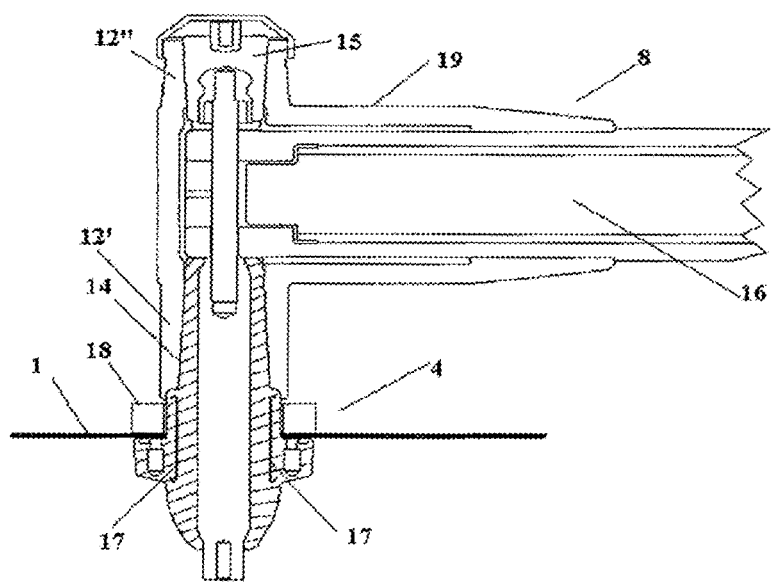
FIG. 2 depicts the voltage sensing device (17), standardizing shield for standardizing the electric field, integrated in the actual coupling means (14) and the intensity sensing device (18). The connection device (8) engaged on the coupling means (14) has also been partially depicted.
Figure 3:
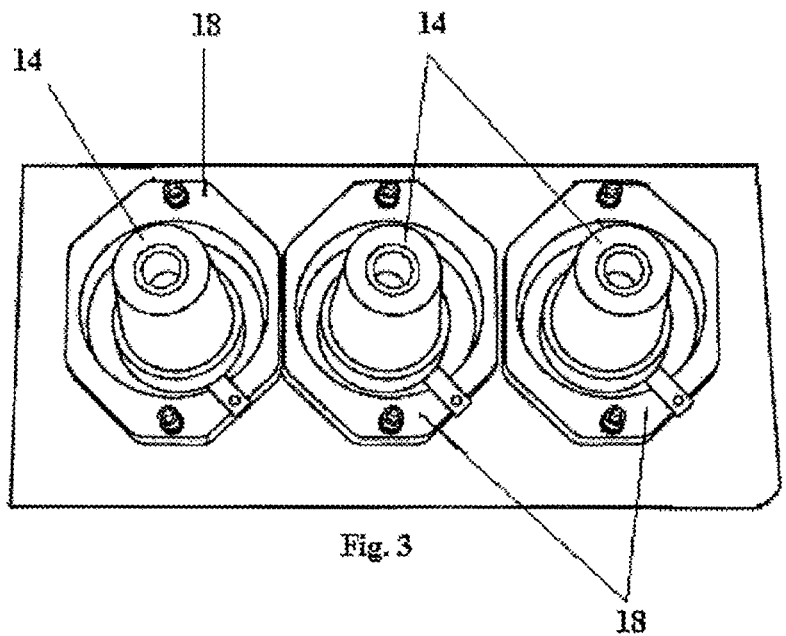
FIG. 3 depicts the arrangement of the intensity sensing devices (18) of each phase installed on the outside and in the base of the coupling means (14).

Likewise, as can be seen in FIG. 2, the possibility that the second coupling means (14) can comprise standardizing shields (17) for standardizing the electric field which allow the capacitive voltage tap has been contemplated. In terms of the measurement of intensity, the measurement/control means (9) can comprise at least one transformer or toroidal sensing device (18) installed on the outside and in the base of the coupling means (14), as shown in FIG. 3.

In short, the reference numbers used in this text and indicated in the mentioned drawings represent the following components of the invention:

1.—High-voltage switchgear
2.—Transformer
3.—Low-voltage switchboard
4.—High-voltage electric connection 5.—Upper cover of the transformer
6.—Modular transformer substation
7.—Low-voltage electric connection
8.—Connection device
9.—Measurement/control means
10.—Control/protection device
11.—Switch
12.—First connection element
12'.—Second connection element
12".—Third connection element
13.—Coupling means of the transformer
14.—Coupling means of the high-voltage switchgear
15.—Coupling means of the connection, control and protection device
16.—Protective element
17.—Standardizing shields for standardizing the electric field
18.—Toroidal sensing device
19.—Solid insulating body
20.—Cooling fins of the transformer
21.—Low-voltage coupling means of the transformer

The invention claimed is:

1. Modular transformer substation comprising at least high-voltage switchgear (1), a low-voltage switchboard (3) and a transformer (2) comprising cooling fins (20) in its four side walls and an upper cover (5) configured to allow a high-voltage electric connection (4) between the transformer (2) and the high-voltage switchgear (1) and a low-voltage electric connection (7) with the low-voltage switchboard (3), the mentioned high-voltage connection (4) being carried out without external cables and through a connection device, on the upper cover (5) of the transformer (2), characterized in that said connection device (8) comprises at least one insulating body (19) inside which there are encapsulated:
  at least one first electric connection element (12) configured for the direct connection to first coupling means (13) provided in the cover of the transformer (2)
  at least one second electric connection element (12') configured for the direct connection to second coupling means (14) of the high-voltage switchgear (1)
  at least one protective element (16) comprising a current-limiting fuse element that can cause the disconnection of the substation (6) when a fault current causing the fuse element to melt occurs,
  and in that the connection device (8) comprises at least one measurement/control means (9) which, in combination with at least one control/protection device (10) of the substation (6), can order the opening of a switch (11) of the high-voltage switchgear (1) causing the disconnection of the substation (6), such that the mentioned protective element (16) acts against fault currents the intensity of which causes the fuse element to melt whereas against fault currents having intensities that do not cause the fuse element to melt, the control/protection device (10) orders the disconnection of the substation (6).

2. Modular transformer substation according to claim 1, wherein the control/protection device (10) comprises indication means for indicating the reason for the disconnection of the substation (6).

3. Modular transformer substation according to claim 1, wherein the control/protection device (10) orders the opening of the switch (11) as a consequence of an overload of the transformer (2).

4. Modular transformer substation according to claim 1, wherein the control/protection device (10) orders the opening of the switch (11) as a consequence of a variation of the pressure inside the transformer (2).

5. Modular transformer substation according to claim 1, wherein the control/protection device (10) orders the opening of the switch (11) as a consequence of a variation in the temperature of the dielectric medium of the transformer (2).

6. Modular transformer substation according to claim 5, wherein the measurement of the temperature variation of the dielectric medium of the transformer (2) can be performed directly or indirectly.

7. Modular transformer substation according to claim 1, wherein the control/protection device (10) orders the opening of the switch (11) as a consequence of a leak of the dielectric medium of the transformer (2).

8. Modular transformer substation according to claim 1, wherein the control/protection device (10) orders the opening of the switch (11) as a consequence of a short circuit in the low-voltage connection (7).

9. Modular transformer substation according to claim 1, wherein the control/protection device (10) orders the opening of the switch (11) as a consequence of a fault between phase and ground of the low-voltage distribution network.

10. Modular transformer substation according to claim 1, wherein the control/protection device (10) orders the opening of the switch (11) as a consequence of a homopolar fault in the transformer substation (6).

11. Modular transformer substation according to claim 1, wherein the control/protection device (10) orders the opening of the switch (11) as a consequence of the actuation of the protective element (16).

12. Modular transformer substation according to claim 1, wherein the protective element (16) is electronically combined with the control/protection device (10).

13. Modular transformer substation according to claim 1, wherein the control/protection device (10) orders the opening of the switch (11) as a consequence of a reverse power.

14. Modular transformer substation according to claim 1, wherein the second coupling means (14) comprise standardizing shields (17) for standardizing the electric field which allow the capacitive voltage tap.

15. Modular transformer substation according to claim 14, wherein the second coupling means (14) comprise at least one transformer or toroidal sensing device (18) installed on the outside and in the base of said coupling means (14).

16. Modular transformer substation according to claim 1, wherein the connection device (8) comprises at least one additional connection element (12") which allows installing the measurement/control means (9) through third coupling means (15).

17. Modular transformer substation according to claim 16, wherein the third coupling means (15) allow installing measurement, control and protection means (9) comprising at least one voltage sensor, at least one voltage transformer, means for receiving/transmitting signals via PLC or means for detecting partial discharges.

18. Modular transformer substation according to any of the previous claims, wherein the coupling means (13, 14, 15) are bushings which are selected from the female type, male type and their combinations, or from a closure plug to assure insulation.

* * * * *